US007741805B2

(12) United States Patent
Zhang et al.

(10) Patent No.: US 7,741,805 B2
(45) Date of Patent: Jun. 22, 2010

(54) METHOD AND APPARATUS FOR MANAGING POWER FLOW OF AN ELECTRIC POWER STORAGE DEVICE

(75) Inventors: Xiaodong Zhang, Mason, OH (US); Nick S. Kapsokavathis, Shelby Township, MI (US); Mutasim A. Salman, Rochester Hills, MI (US); David W. Walters, Sterling Heights, MI (US); Xidong Tang, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 292 days.

(21) Appl. No.: 11/838,223

(22) Filed: Aug. 14, 2007

(65) Prior Publication Data

US 2009/0045815 A1    Feb. 19, 2009

(51) Int. Cl.
  H02J 7/14      (2006.01)
  H02J 7/00      (2006.01)
  H02J 7/16      (2006.01)
(52) U.S. Cl. .................... 320/104; 320/132; 320/152
(58) Field of Classification Search ............... 320/132, 320/104
  See application file for complete search history.

(56) References Cited

U.S. PATENT DOCUMENTS 6,331,762 B1 * 12/2001 Bertness ................ 320/134
6,909,287 B2   6/2005 Bertness
7,098,665 B2 * 8/2006 Laig-Hoerstebrock ...... 324/430

OTHER PUBLICATIONS

Verbrugge, Adaptive Energy Management of Electric and Hybrid Electric Vehicles, 2005, Journal of the Electrochemical Society, 152 (2), A333-342.*
Verbrugge,M;Adaptive Energy Mgt. of Electric and Hybrid-Electric Vehicles;J.Electrochemical Soc;2005; 152(2)A333-342; USA.
Blanke,H;Impedance Measurements of Pb-acid Batteries for SOC, SOH, & Cranking Capability Prognosis; J.Power Sources;2005;144(2005)418-425; www.sciencedirect.com.
Schollmann,M;Battery Monitoring with the Intelligent Battery Sensor During Service, Standby and Production;SAE;2005;2005-01-0561; USA.

* cited by examiner

*Primary Examiner*—Edward Tso
*Assistant Examiner*—Ahmed Omar

(57) ABSTRACT

An electrical power storage device provides power to crank an internal combustion engine. Thereafter available power from the electric power storage device to crank the engine again is continually updated. Remedial measures are invoked if the available power is less than a predetermined power threshold.

11 Claims, 3 Drawing Sheets

| OCV(T, SOC) (Volts) | -29°C | -18°C | 0°C | 25°C | 52°C |
|---|---|---|---|---|---|
| 100% SOC | 12.565 | 12.688 | 12.775 | 12.807 | 12.832 |
| 90 | 12.454 | 12.58 | 12.673 | 12.707 | 12.727 |
| 80 | 12.339 | 12.46 | 12.569 | 12.606 | 12.621 |
| 70 | 12.222 | 12.355 | 12.463 | 12.504 | 12.515 |
| 60 | 12.101 | 12.24 | 12.356 | 12.402 | 12.407 |
| 50 | 12.977 | 12.121 | 12.248 | 12.297 | 12.298 |
| 40 | 11.848 | 12.999 | 12.137 | 12.191 | 12.187 |
| 30 | 11.711 | 12.873 | 12.024 | 12.083 | 12.073 |
| 20 | 11.559 | 11.736 | 11.905 | 11.972 | 11.954 |
| 10 | 11.373 | 11.574 | 11.77 | 11.858 | 11.828 |

…
METHOD AND APPARATUS FOR MANAGING POWER FLOW OF AN ELECTRIC POWER STORAGE DEVICE

TECHNICAL FIELD

This disclosure generally relates to managing power flow of an electrical power storage device.

BACKGROUND OF THE INVENTION

The statements in this section merely provide background information related to the present disclosure and may not constitute prior art.

Modern vehicles are highly dependent on proper operation of an electric power generation and storage system. The number of electrical devices has been rapidly increasing in the last two decades, and this trend will accelerate. The vehicle electric power system is required to supply sufficient power not only to safety related systems such as rear window defogger, anti-lock braking and stability enhancement system, but also to comfort, convenience and entertainment features such as air conditioning, seat heating, audio and video systems. The advent of new technologies such as X-by-wire is putting additional demand on the battery. Consistent power flow from an electric power storage device, such as a battery, is critical for maintaining proper vehicle operations. Battery problems lead to customer dissatisfaction and service issues. Therefore, there is a need to monitor and control the ability of the battery to deliver power throughout various vehicle operation modes and throughout battery life.

An essential function of automotive batteries is to deliver high power in short periods, for instance, during engine cranking. Modern vehicle control systems utilize an electric power management system to balance power demanded and supplied during vehicle operation and to provide engine starting power. Battery state is an essential element of any electric power management system. Due to the electrochemical nature of battery devices, numerous factors affect the battery state, thus making determination of battery status complicated. The battery state is represented by state of charge (SOC) and state of health (SOH). The SOC represents the stored power/energy available, and the SOH is an indication of power capability and battery capacity. To achieve accurate power management, both battery SOC and SOH should be taken into account.

One known approach to vehicle electric power management for load shed and idle boost is based only on an index of battery state of charge. Other power management systems and methods have attempted to predict battery cranking capability based on battery cranking current or voltage. These systems require a high current sensor to measure battery current during cranking (e.g., 800-1000 Amps). Furthermore, there is no method identified to determine a threshold of cranking current or voltage for power management that takes into account both battery SOC and SOH. At least one method used for power management on a hybrid vehicle is based on battery model parameters that are identified during normal vehicle operation. However, real-time battery model parameter identification during normal operation requires the battery voltage and current signals to satisfy the condition of persistency of excitation, which is usually not applicable to conventional vehicles. Furthermore, the computational cost of such a method is high because it requires data acquisition and signal processing at a high sampling rate.

Therefore, there is a need for a cost-effective monitoring and control system for an electric power storage device to achieve accurate and reliable power management, taking into account both battery state of charge (SOC) and state of health (SOH), to address the aforementioned concerns.

SUMMARY OF THE INVENTION

A method for managing electric power flow of an electric power storage device adapted to provide power through an electric circuit including an electric machine to crank an internal combustion engine includes cranking the engine a first time. After such cranking, available power from the electric power storage device to crank the engine again is continually updated. If the available power is less than a predetermined power threshold, remedial measures including at least one of reducing power flow out of the electric power storage device and increasing power flow to the electric power storage device are invoked.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
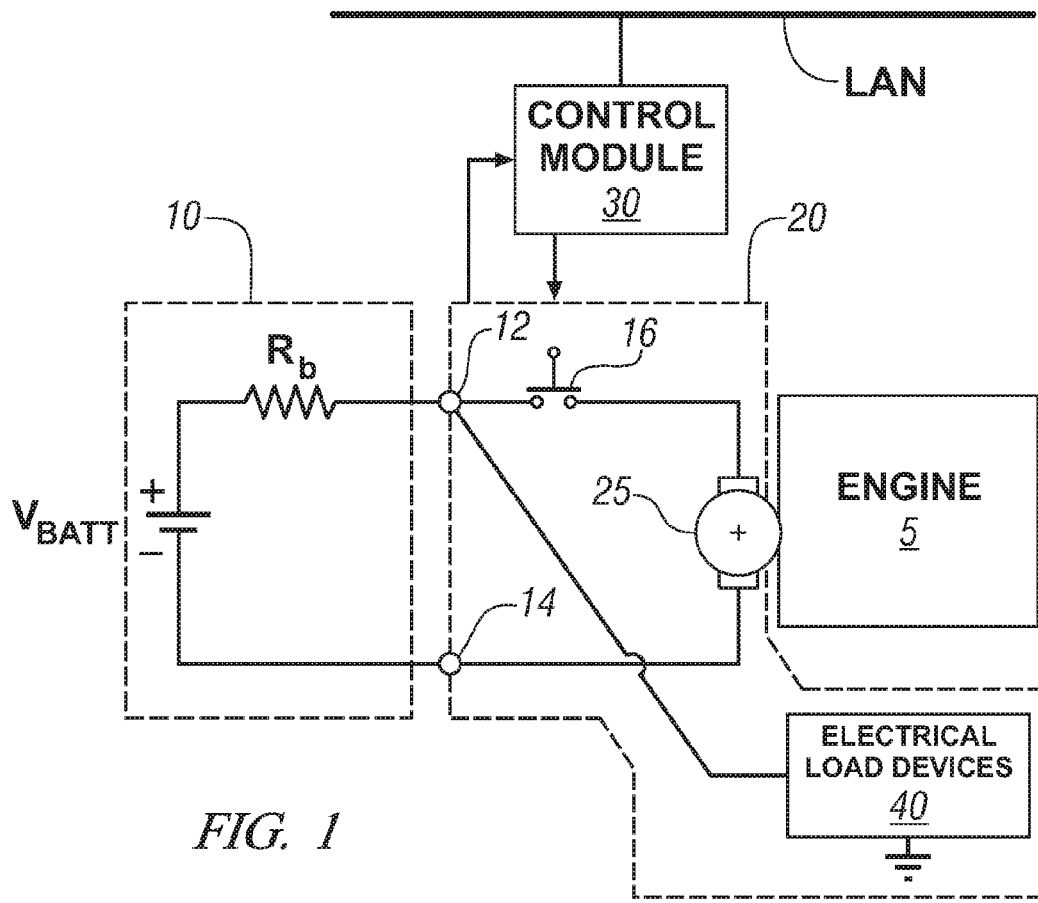
FIG. 1 is a schematic diagram of an exemplary electric circuit.

Referring now to the drawings, wherein the showings are for the purpose of illustrating embodiments, FIG. 1 depicts a schematic diagram of a circuit constructed in accordance with an embodiment. The circuit comprises an electric power storage device 10 (EPSD) selectively electrically connected to an electric circuit 20 including an electric machine 25, which is electrically connected to the EPSD via a wiring harness through actuation of a switch 16, and other electrical load devices. The EPSD is characterized in terms of an internal resistance ($R_b$), an open-circuit voltage or potential ($V_{OCV}$), and an electrical power flow across terminals 12, 14 comprising a voltage ($V_{BATT}$), and, an electrical current ($I_{batt}$). The electric circuit 20 is characterized in terms of electrical impedance, including a circuit resistance (Rc). In the embodiment depicted, the EPSD comprises a conventional electrochemical device such as a lead-acid battery, although such application is exemplary and not limiting. The EPSD is selectively connected to and operative to supply electric power to the electric machine 25 comprising a starter motor adapted to crank an internal combustion engine 5 upon actuation of the switch 16 which comprises an ignition switch. The ignition switch may be actuated manually by a vehicle operator, or in response to a command by an engine control module 30 as part of a vehicle configuration using an engine stop-start strategy. The EPSD is electrically connected to and operative to supply electric power to various load devices (not illustrated in detail). When EPSD and electric circuit 20 are included as elements on a motor vehicle, there is a plurality of electrical load devices 40. The electric load devices typically comprise body systems such as HVAC, entertainment systems, instrument panels, window defoggers, and interior and exterior lighting, chassis components related to braking, steering and stability control, and fuel delivery systems, and engine accessories such as fuel injectors. Parasitic loads, i.e., those that drain the EPSD during engine-off periods, include keep-alive power for control modules including memory devices and security systems.

The internal combustion engine 5 preferably comprises a known multi-cylinder device operative to combust fuel to generate rotational power at a crankshaft. The engine output is transmitted to an output, e.g., vehicle wheels, via a transmission device. The transmission device may comprise a conventional fixed gear transmission or, alternatively, some form of electro-mechanical hybrid device which combines electric power and mechanical power to generate a torque output. In the embodiment depicted, there is included an electric power generation device (not shown), for example an alternator, which is typically rotatably connected to the engine crankshaft via a belt-drive, to generate electric power for charging the EPSD. Alternatively, the electric machine 25 may comprise a controlled motor/generator device which is operative to crank the engine under specific operating conditions and to generate electric charging power under other operating conditions.

The control module 30 is preferably a general-purpose digital computer generally comprising a microprocessor or central processing unit, storage mediums comprising non-volatile memory devices including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in memory and executable to provide the respective functions of the computer. The control module 30 can be signally connected to other control modules of an overall control architecture via a local area network (LAN). The LAN can communicate information related to operator requests for power, and, control and operation of other vehicle operating states.

Figure 2:
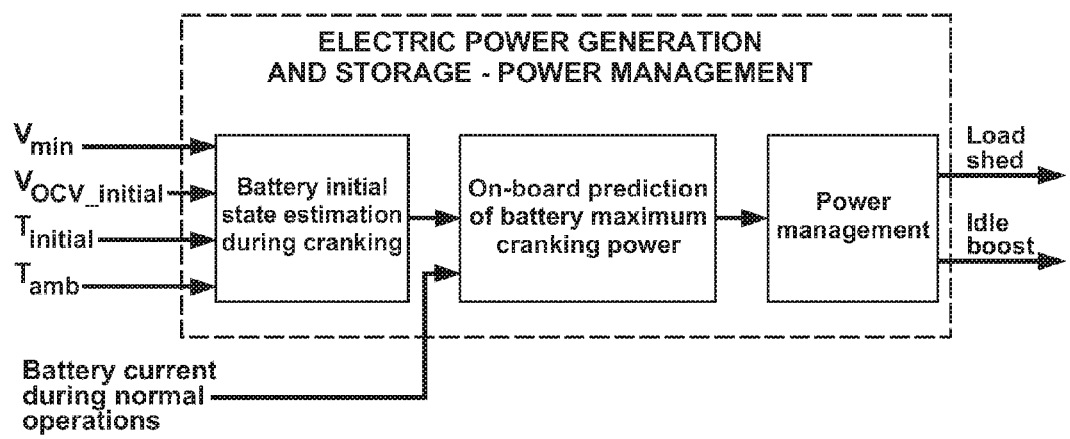
FIGS. 2 and 3 comprise schematic diagrams of control schemes.

Referring now to FIG. 2, disclosed is a method for managing electrical power usage in the electric circuit comprising the EPSD and associated circuitry including electric circuit 20 comprising the electric machine 25 and the electrical load devices 40. The method includes determining initial state of the EPSD at an engine crank event, and determining state of the electric circuit, including the EPSD, during operation subsequent to the engine crank event. A maximum cranking power provided by the EPSD is estimated for a subsequent engine crank event based upon the states. The estimated maximum cranking power is compared to a threshold to ensure the EPSD cranking capability. The electric power flow from the EPSD is selectively managed and controlled during the ongoing operation based thereupon, as described. This is now described in greater detail with reference to FIGS. 3, 4, and 5.

The system is activated by actuating the switch 16 to apply a short-duration, high-current electrical load to the EPSD through the electric circuit 20, e.g., cranking the engine to start operation thereof. In the embodiment depicted, the control module 30 actuates the switch 16, typically in response to input from the vehicle operator or based upon an engine stop/start routine. The control module monitors the electrical flow across terminals 12, 14.

Figure 3:
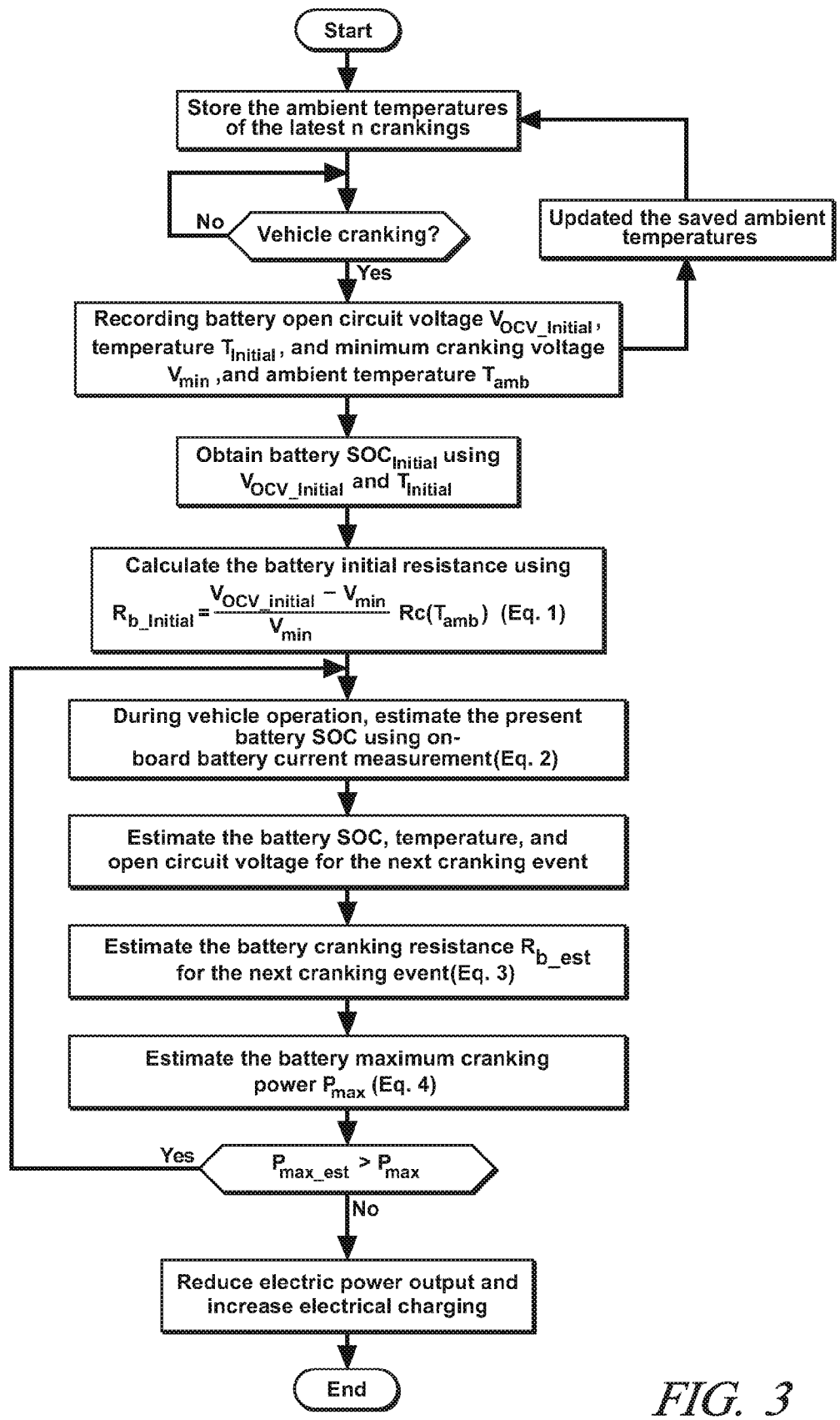

Determining state of the EPSD at the engine crank event comprises the following three steps, as shown in FIG. 3. An initial open circuit voltage of the EPSD ($V_{OCV\_Initial}$), temperature of the EPSD ($T_{Initial}$), ambient temperature ($T_{amb}$), and minimum cranking voltage ($V_{min}$) of the EPSD are measured and recorded at the initiation of the crank event. Additionally, ambient temperatures recorded during the N previous engine crank events are updated with the present ambient temperature, with N for example comprising five engine crank events. Second, an initial state of charge ($SOC_{Initial}$) of the EPSD is derived from $V_{OCV\_Initial}$ and $T_{Initial}$ through a pre-calibrated look-up table. Third, an initial internal resistance of the EPSD ($R_{b\_Initial}$) is computed using Eq 1:

$$R_{b\_Initial} = \frac{V_{ocv\_initial} - V_{min}}{V_{min}} Rc(T_{amb}), \qquad [1]$$

wherein $Rc(T_{amb})$ is the resistance of the cranking circuit, based upon the ambient temperature.

The cranking circuit resistance, Rc, comprises resistance of electric circuit 20, excluding the internal resistance of the EPSD, $R_b$, and resistances of the electric load devices 40. The cranking circuit resistance, Rc, comprehends and includes all the circuit components, including wiring harness cable, motor brushes, and other components to the electric starter motor 25, and is preferably determined during standardized cranking testing during preproduction vehicle calibration and development. The cranking circuit resistance Rc is typically calculated as the minimum cranking voltage divided by a maximum electrical current ($I_{max}$) occurring during the crank, i.e., $V_{min}/I_{max}$. The cranking circuit resistance Rc typically varies depending upon temperature of the cranking circuit, which can be determined from the ambient temperature, and depicted as $Rc(T_{amb})$.

During operation subsequent to the engine crank and start event, EPSD parameters expected to occur during the next cranking event are estimated based on the initial state of charge $SOC_{Initial}$. Operation comprises engine operation, vehicle operation that includes the engine operation, and operation of vehicle accessories during key-off periods, all of which result in power flow through the EPSD. The EPSD parameters include an estimated state of charge ($SOC_{est}$), which comprises a present state of charge ($SOC_{present}$) less a calibrated state of charge loss due to parasitic load on the EPSD when the engine is off. The present state of charge is generally determined as in Eq. 2:

$$SOC_{present} = SOC_{Initial} = \frac{\int I dt}{capacity} \qquad [2]$$

wherein I represents the current flow through the EPSD. Estimates of parasitic loads are preferably obtained from calibration data sets predetermined during vehicle development and retrievably stored in computer memory.

The ambient temperature for the next engine cranking event ($T_{est}$) is estimated, preferably comprising the lowest ambient temperature of the latest N crankings, as previously described. Preferably, the EPSD temperature at the next cranking event is estimated to be substantially equivalent to the ambient temperature for the next engine cranking event ($T_{est}$) based on the worst case lowest temperature scenario. An estimate of the open circuit voltage for the next engine cranking event ($V_{OCV\_est}$) is determined, and preferably comprises a precalibrated value stored in a memory lookup table based upon $SOC_{est}$ and the estimated temperature of the EPSD at the next cranking event which is, as mentioned, preferably estimated to be substantially equivalent to the ambient temperature for the next engine cranking event ($T_{est}$).

Figures 4, 5:
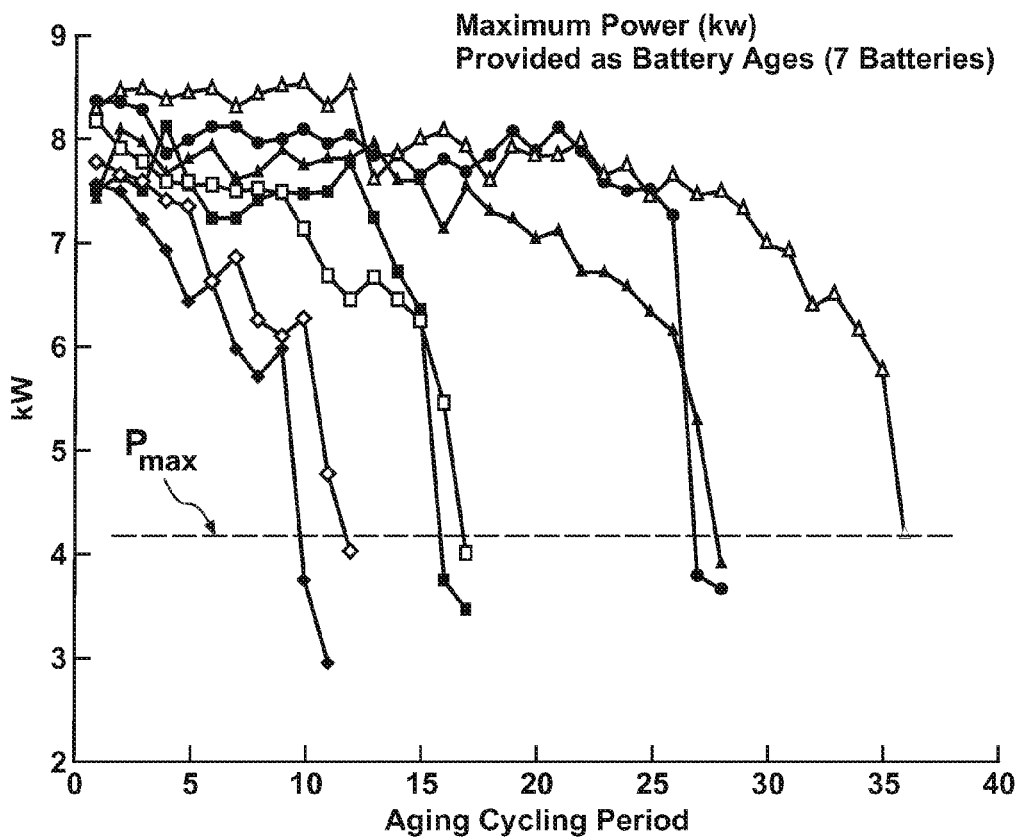
FIG. 4 is a dataset in tabular form.
FIG. 5 is a dataset in graphical form.

Referring now to FIG. 4, an exemplary dataset comprising a plurality of open circuit voltage states for an EPSD comprising an exemplary nominal 12-Volt battery device across ranges of temperature states (T) and states of charge (SOC) is depicted in tabular form. The data set is preferably determined by conducting testing off-line during development to generate data to construct calibration tables for storage and subsequent implementation in the control module for use by the algorithm.

An estimated internal resistance of the EPSD for the next cranking event ($R_{b\_est}$) is determined as follows, in Eq. 3.

$$R_{b\_est} = R_{b\_Initial} * [1 + \alpha*(SOC_{Initial} - SOC_{est}) + \beta*(T_{Initial} - T_{est})] \quad [3]$$

wherein: $\alpha$ and $\beta$ are calibration values determined during preproduction laboratory testing of the exemplary nominal 12-Volt battery device characterizing the effect of SOC change and temperature change on the cranking resistance.

An estimated maximum cranking power ($P_{max\_est}$) can be determined as follows, in Eq. 4, based upon the estimated open circuit voltage and internal resistance, above.

$$P_{max\_est} = \left[\frac{V_{OCV\_est}}{Rc(T_{est}) + R_{b\_est}}\right]^2 * Rc(T_{est}) \quad [4]$$

The estimated maximum cranking power, $P_{max\_est}$, is compared to a predetermined threshold cranking power, $P_{max}$ ($T_{est}$), which represents the power required to crank an engine at the estimated ambient temperature for the next engine cranking event ($T_{est}$).

When the predicted maximum cranking power, $P_{max\_est}$, is less than the threshold cranking power, $P_{max}$ ($T_{est}$), the control module acts to take remedial measures including, for example, reducing electric power flow from the EPSD and/or increasing electrical charging (power flow) to the EPSD. This includes increasing idle speed of the engine 5 to increase state of charge of the EPSD, and, selectively reducing electric power consumption in the vehicle to minimize reduction of the state of charge. The substance of FIG. 3 comprises an algorithmic flowchart which details the decision-making process described hereinabove.

The threshold cranking power $P_{max}$ ($T_{est}$) comprises a calibrated one-dimensional look-up table with respect to the estimated ambient temperature for the next engine cranking event ($T_{est}$). The look-up table is preferably calibrated by conducting off-line vehicle cranking tests. The EPSD SOC can be continuously reduced, until its cranking time exceeds the specified maximum time allowed or it just fails to crank the engine at the specified temperature $T_{est}$. Then the electric power required to crank the engine, $P_{max}$ ($T_{est}$), can be calculated as the minimum cranking voltage ($V_{min}$) multiplied by a maximum electrical current ($I_{max}$) during cranking, i.e., $V_{min}*I_{max}$.

Referring now to FIG. 5, a datagraph depicts cranking data developed using on-vehicle testing of seven EPSDs comprising exemplary nominal 12-Volt battery devices, illustrative of the applicability of the concept described hereinabove. Seven EPSDs were aged from new to end-of-useful-life, using accelerated aging cycling. Cranking data was periodically collected during the aging process. As depicted, the maximum power supplied by the EPSDs decreases as a result of aging. The results are consistent across the EPSDs tested, demonstrating an ability to effectively determine the predicted estimated maximum cranking power, $P_{max\_est}$, and threshold cranking power, $P_{max}$ ($T_{est}$), using real vehicle cranking data.

The disclosure has described certain preferred embodiments and modifications thereto. Further modifications and alterations may occur to others upon reading and understanding the specification. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. Method for managing electric power flow of an electric power storage device adapted to provide power through an electric circuit including an electric machine to crank an internal combustion engine, the method comprising:
   cranking the engine during a first engine cranking event;
   after cranking the engine during the first engine cranking event, continually updating an available power from the electric power storage device to crank the engine during a second engine cranking event subsequent to the first engine cranking event based on an initial estimate of an internal resistance of the electric power storage device computed as a function of an open circuit voltage of the electric power storage device, a resistance of the electric circuit, and a minimum voltage of the electric power storage device corresponding to the first engine cranking event;
   determining a power threshold required to crank the engine during the second engine cranking event as a function of a lowest ambient temperature corresponding to a predetermined number of engine cranking events preceding the second engine cranking event; and
   if the available power is less than the power threshold, taking remedial measures including at least one of reducing power flow out of the electric power storage device and increasing power flow to the electric power storage device.

2. Method for managing electric power flow of an electric power storage device adapted to provide power through an electric circuit including an electric machine to crank an internal combustion engine, the method comprising:
   cranking the engine during a first engine cranking event;
   after cranking the engine during the first engine cranking event, continually updating an available power from the electric power storage device to crank the engine-during a second engine cranking event subsequent to the first engine cranking event based on an initial estimate of an internal resistance of the electric power storage device computed as a function of an open circuit voltage of the electric power storage device, a resistance of the electric circuit and a minimum voltage of the electric power storage device corresponding to the first engine cranking event; and
   if the available power is less than a predetermined cranking power threshold, taking remedial measures including at least one of reducing power flow out of the electric power storage device and increasing power flow to the electric power storage device.

3. The method of claim 2 wherein continually updating an available power from the electric power storage device further comprises:
   estimating the available power based on a present estimate of the internal resistance of the electric power energy storage device updated continuously subsequent to the first engine cranking event.

4. The method of claim 3 wherein the present estimate of the internal resistance of the electric power storage device is estimated as a function of the initial estimate of the internal resistance, a change in a state of charge of the electric power storage device since the first engine cranking event, and a difference between a temperature of the electric power storage device corresponding to the first engine cranking event and an estimate of the temperature of the electric power storage device corresponding to the second engine cranking event.

5. The method of claim 2, wherein the initial estimate of the internal resistance of the electric power storage device is further computed as a function of a cranking circuit resistance corresponding to the first engine cranking event.

6. Method for managing electric power flow of an electric power storage device, comprising:

electrically operatively coupling the electric power storage device to an electric circuit comprising an electric machine adapted to crank an engine;

measuring at a first engine crank event an initial open circuit voltage of the electric power storage device, an initial minimum voltage of the electric power storage device, an initial ambient temperature, and an initial temperature of the electric power storage device;

determining an initial cranking circuit resistance as a function of the initial ambient temperature;

deriving an initial state of charge of the electric power storage device as a function of the initial open circuit voltage of the electric power storage device and the initial temperature of the electric power storage device;

computing an initial internal resistance of the electric power storage device as a function of the initial open circuit voltage of the electric power storage device, the initial minimum voltage of the electric power storage device, and the initial cranking circuit resistance;

estimating subsequent to the first engine crank event a future state of charge of the electric power storage device expected to occur during a second engine crank event subsequent to the first engine crank event as a function of the initial state of charge of the electric power storage device, estimating a future ambient temperature corresponding to the second engine crank event, and estimating a future temperature of the electric power storage device corresponding to the second engine crank event;

determining subsequent to the first engine crank event a future internal resistance of the electric power storage device corresponding to the second engine crank event as a function of the initial internal resistance of the electric power storage device, the initial and future states of charge of the electric power storage device, and the initial and future temperatures of the electric power storage device;

estimating subsequent to the first engine crank event a future open circuit voltage of the electric power storage device corresponding to the second engine crank event as a function of the future state of charge of the electric power storage device and the future temperature of the electric power storage device;

predicting a maximum cranking power of the electric power storage device available for the second engine crank event as a function of the future open circuit voltage of the electric power storage device, the future internal resistance of the electric power storage device, and a future cranking circuit resistance as a function of the future ambient temperature;

comparing the predicted maximum cranking power of the electric power storage device to a predetermined cranking threshold power; and, controlling the electric power flow of the electric power storage device based upon said comparison.

7. The method of claim 6, wherein the future state of charge of the electric power storage device is further estimated as a function of a predicted parasitic load on the electric circuit.

8. The method of claim 6, wherein controlling the electric power flow from the electric power storage device comprises increasing engine idle speed to increase state of charge of the electric power storage device and decreasing electric power consumption when the predicted maximum cranking power is less than the cranking threshold power.

9. The method of claim 6, wherein the electric power threshold comprises a power flow of the electric power storage device required to drive the electric machine to crank the engine.

10. The method of claim 6, further comprising controlling the electric power flow of the electric power storage device prior to the second engine crank event.

11. The method of claim 6, wherein the predetermined threshold power is determined as a function of a lowest ambient temperature corresponding to a predetermined number of engine crank events preceding the second engine crank event.

* * * * *